March 18, 1941.  N. HAUSKNECHT  2,235,519
WAX APPLICATOR
Filed March 28, 1940
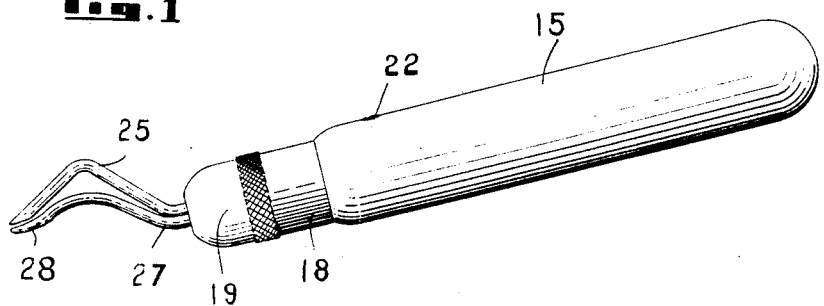
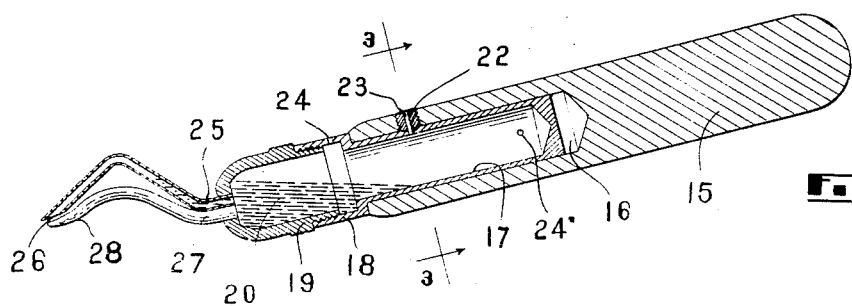
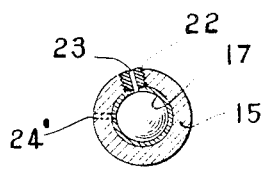
INVENTOR.
Norbert Hausknecht Patented Mar. 18, 1941

2,235,519

UNITED STATES PATENT OFFICE 2,235,519

WAX APPLICATOR

Norbert Hausknecht, Brooklyn, N. Y.

Application March 28, 1940, Serial No. 326,435

3 Claims. (Cl. 91—62.5)

This invention relates to implements used by artisans in the application of plastic substances, rendered semi-fluid when subjected to heat, such as waxes of various kinds.

The use of such substances is common by dentists in the preparation of dental casts, pattern makers to produce concavely curved fillets, and many others, who, due to the lack of such instrument, must necessarily use small fragments of the material, slowly heated and applied by a spatula or like device.

The present invention has as its object to provide an implement having a readily refillable reservoir to receive the substance, reduce it, by the application of heat, to a flowing condition, and apply the same in a manner quite similar to the operation of a fountain pen.

A further feature is in the provision for guiding the distributor relative to the work surface.

Another purpose is to produce a simple, reliable tool for the purpose that can be cheaply constructed.

These and other desirable objects are attained by the novel construction, combination and arrangement of parts hereinafter described and illustrated in the accompanying drawing, constituting a component of this disclosure, and in which:

Figure 1 is a side elevational view of an embodiment of a complete embodiment of the invention, ready for use.

Figure 2 is a longitudinal sectional view thereof.

Figure 3 is a transverse sectional view taken on line 3—3 of Figure 2.

Throughout the several views a handle is designated generally by the numeral 15, and while shown as cylindrical in shape, may obviously be of any other preferred form, made of inflammable material non-conductive to heat, and not injured by the mild heat that may be conducted to it.

The handle contains a bored recess 16 in one end, in which is inserted a tubular container 17 having an enlarged, outer extending head 18 having an internal screw thread, the container being preferably of brass.

A copper cap 19, having a knurled portion for convenience in turning, is removably secured by its screw threads to the head to its shouldered portion and is adapted to be readily removed for replenishing the contents 20.

The container is provided with a counter-sunk opening suited to receive the points of a binding screw 22, through which is an axial passage 23 communicative with the interior of the container for the inlet of air.

Another vent 24 is provided in the head 18, at the inner end of the cap threads, and a third vent 24' may be made in the container near its inner, closed end.

Extending rigidly from the curved outer end of the cap 19, is a copper distributor tube 25 bent angularly and terminating in an open mouth 26, the tube at its inner end being open to the container.

Also fixed in the cap, closely adjacent to the tube 25, is a curved slicker rod 27 its end 28 being closely contiguous to the tube opening 26, the rod acting as a conductor of heat as well as to smooth the substance delivered from the mouth of the tube.

In operation, the cap is removed, the container supplied with fragments of the material to be distributed, the cap re-adjusted and heat applied to the exterior, as by a gas flame, alcohol lamp or the like, air entering and escaping through the several vents.

The effect of the rod is similar to that of a spatular in spreading and smoothing the material in an effective and workmanlike manner.

Although the foregoing is descriptive of the best known embodiment of the invention it is not to be regarded as restrictive, as minor changes may be made as come within the concept of the appended claims.

Having thus described the invention including the manner of its construction and operation, what is claimed as new and sought to secure by Letters Patent, is:

1. A wax distributor comprising a heat non-conductive handle having a recess open at one end, a tubular container fitted to the handle recess and having an enlarged head extending therebeyond, a set screw in said handle to impinge on said container, said screw having a vent passage communicating with the interior of the container, a knurled screw cap removably engaged with said head, a bent tube fixed in said head to extend outwardly, said tube open to said container at its inner end and to the atmosphere at its outer end, a slicker rod set in said cap to extend coincidently with the outlet of said tube and spaced therebelow, said cap, tube and rod being made of heat conductive material, and a series of air vents for said container.

2. A wax distributor comprising a non-metallic handle, a tubular container removably engaged therein, a cap threadably engaged on said container, a tube fixed in the cap and open thereto, said tube having an open bevelled mouth, and a slicker rod fixed in the cap to extend adjacently parallel with said tube, the end of said rod disposed closely below the bevelled mouth of said tube.

3. A wax distributor comprising a handled container having a removable cap, a distributor tube set in said cap, a slicker rod fixed in the cap to extend substantially parallel with said tube and terminating adjacently below its open outer end, and means for venting said container.

NORBERT HAUSKNECHT.